United States Patent [19]

Wichterle et al.

[11] Patent Number: 4,609,507
[45] Date of Patent: Sep. 2, 1986

[54] METHOD FOR CASTING POLYMERIC GELS FROM VOLATILE MIXTURES OF MONOMER IN OPEN MOLDS AND APPARATUS FOR PERFORMING THIS METHOD

[75] Inventors: Otto Wichterle; Ivan Wichterle, both of Prague, Czechoslovakia

[73] Assignee: Ceskoslovenska Akademi Ved, Prague, Czechoslovakia

[21] Appl. No.: 718,683

[22] Filed: Apr. 3, 1985

[30] Foreign Application Priority Data

Apr. 6, 1984 [CS] Czechoslovakia ............... 2657-84

[51] Int. Cl.$^4$ .............................................. B29D 11/00
[52] U.S. Cl. ...................... 264/1.1; 264/2.6; 264/83; 264/85; 264/331.18
[58] Field of Search ............... 264/1.1, 2.6, 83, 85, 264/331.18

[56] References Cited

U.S. PATENT DOCUMENTS 2,935,372  5/1960  Steuber ............................ 264/83
3,333,034  7/1967  Muller ............................. 264/83

Primary Examiner—Paul R. Michl

Attorney, Agent, or Firm—Hoffmann, Dilworth, Barrese & Baron

[57] ABSTRACT

The invention pertains to a method for casting polymeric gels from volatile mixtures of monomers in open molds and to apparatus for performing this method.

The principle of the invention resides in the fact that the same concentrations of volatile components present in the polymerization mixture are also present in the gaseous state within a protective gas maintained above the free surface of the polymerization mixture, said gaseous volatile components being in the equilibrium state with those in the polymerization mixture at polymerization temperature.

The apparatus for performing said method comprises a main pipe branch which introduces a pure protective gas into a polymerization apparatus and at least one auxiliary pipe branch for saturating the protective gas with a volatile component. These main and auxiliary pipe branches are formed by an inlet pipe connected to a control valve for setting a constant volume flow-rate and further leading to a device for measurement of the flow rate, where their outlet pipes are connected to a common inlet entering the polymerization apparatus and a saturator for a pure volatile component of the monomer mixture is arranged within the auxiliary branch before the outlet pipe.

15 Claims, 1 Drawing Figure

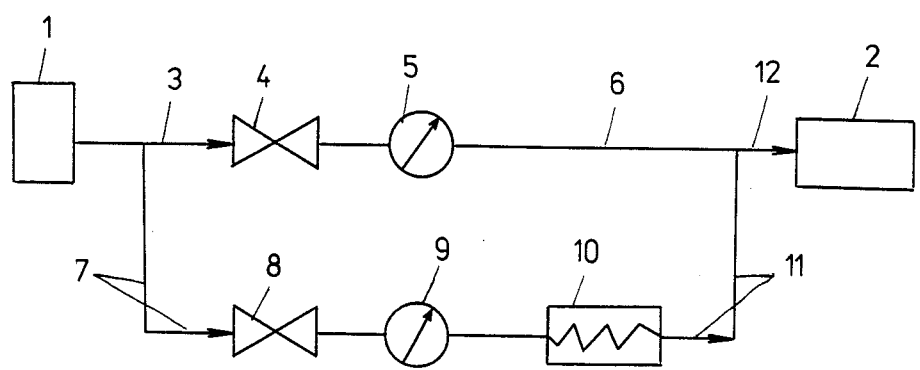

METHOD FOR CASTING POLYMERIC GELS FROM VOLATILE MIXTURES OF MONOMER IN OPEN MOLDS AND APPARATUS FOR PERFORMING THIS METHOD

BACKGROUND OF THE INVENTION

The invention pertains to a method for casting polymeric gels from volatile mixtures of monomers in open molds and to an apparatus for performing this method.

One of the most efficient methods of manufacturing shaped articles from plastics is the casting of monomers or their mixtures in molds under polymerization conditions. The method of casting in open molds can be used for some purposes in particular advantageously, for example, for casting foils on horizontal plates or for casting contact lenses in rotating open molds demarcated by a sharp edge. The latter method has been so far applicable only for such starting monomer mixtures where none of the components are pronouncedly volatile under the conditions of the entire procedure. However, if even only one of the monomers used, or a single component of the solution of monomer mixture employed, is volatile under the polymerization conditions, the more volatile components will evaporate from the open surface of the cast mixture and the composition of the surface layers will change. A casting obtained in this way is a substantially nonhomogeneous composition with the result that the casting is extensively deformed.

Thus, for example, contact lenses prepared by centrifugal casting of a monomer mixture of hydroxyethyl methacrylate and acrylic acid in the presence of a crosslinking agent or in the presence of inert solvents always perform more poorly due to the lower hydrophilicity of their inner surface caused by loss of the more hydrophilic component (i.e., acrylic acid), and such cast lenses always roll up in an uncontrollable way. Similarly, gels cast from a mixture of N-vinyl-pyrrolidone and methyl methacrylate lose the much more volatile methyl methacrylate component at the free surface. As a consequence, the upper layers are more swellable with water and the lenses are sometimes deformed to such an extent that they turn inside out in an uncontrollable way after swelling.

Similar difficulties also occur in the polymerization of substantially nonvolatile monomers which are diluted with volatile solvents. For example, if water is used as a solvent in the polymerization of mixtures of hydroxyethyl methacrylate with sodium methacrylate, the mixture becomes concentrated at its free surface by evaporation of water so that the resulting hydrophilic gel, brought into equilibrium with water, is more contracted on the originally open side than on the other side thereby causing its extensive deformation.

These difficulties also occur to a lesser extent when the polymerization of the monomer mixture is carried out with an open surface but in closed molds if this surface comes into contact with a protective gas before the mold is closed. It is possible for the protective gas to remove a volatile component from the surface of the monomer mixture over a shorter or longer period of time and at the very least, the mixture must be saturated to equilibrium with this component in the closed mold and its concentration at the surface reduced in this way.

SUMMARY OF THE INVENTION

The above difficulties are completely or almost completely overcome by the method according to the invention, which consists in adding an amount of each volatile component of the monomer mixture to a protective gas which is provided above the free surface of the monomer mixture in the molds, said amount of volatile component being sufficient to attain the partial pressure of each volatile component which corresponds to the partial pressure of said component above the surface of the monomer mixture.

The protective gas is mixed, in the method according to the invention, in a predetermined ratio with one or more streams of a protective gas which is saturated by being passed through a pure volatile component controlled to an accurate temperature which is advantageously the working temperature of the apparatus. Nitrogen, argon, carbon dioxide or other inert gas, or their mixtures, are advantageously used as the protective gas.

BRIEF DESCRIPTION OF THE DRAWING

The invention is further illustrated in the attached drawing which shows diagrammatically one embodiment of apparatus useful in carrying out the method of the invention.

DESCRIPTION OF THE PREFERRED EMBODIMENTS

The apparatus for performing the foregoing method consists of a main pipe branch for introducing the pure protective gas into a polymerization apparatus and at least one auxiliary pipe branch for saturating the protective gas with the volatile component. These branches are formed by an inlet pipe connected with a control valve for setting a constant volume rate of flow and a device for flow measurement placed behind this valve and the pipe outlets are combined into a common inlet into the polymerization apparatus. A saturator for the pure volatile component of the monomer mixture is placed before the outlet pipe of the auxiliary branch. The inlet pipe of the auxiliary branch is advantageously connected to the inlet pipe of the main branch. The saturator for the pure volatile component of the monomer mixture may be placed behind the device for flow measurement. A sprinkler column with a circulation pump or a labyrinth saturator with a free level (to minimize droplet entrainment) may be used, for example, as a saturator. The volume flow rate can be measured, e.g., by rotameters or Venturi tubes. The number of auxiliary branches with saturators corresponds to the number of volatile components (monomers or solvents) present in the monomer mixture.

The vapor pressure of individual components above the given monomer mixture can be relatively easily measured by the analysis of carrier gas brought into equilibrium with the mixture. In addition to this, sufficiently accurate and relatively reliable information can also be obtained by calculations, e.g., by the method of group contributions known as "UNIFAC" (Fredenslund A., Gmehling J., Rasmussen P.: *Vapor-Liquid Equilibria Using UNIFAC*, Elsevier, Amsterdam, 1977). This method assumes that the liquid phase is formed by a solution of molecular groups, the contribution of which to the total activity coefficient of the component can be quantified. Numerical data on the extent of the group interactions required for this calculation were already twice revised and expanded (Gmehling J., Rasmussen P. Fredenslund A.: *Ind. Eng. Chem., Process Des. Develop.* 21, 118–127 (1982)). Reliability of this method may be considerably enhanced if it is applied to solutions with a limited system of groups (similar types of solutions), where a subsystem of contributions is calculated from activity coefficients of systems, which contain just the needed groups.

Relationship for the ideal solution may be used as a completely sufficient approximation under the conditions of calculation which should be carried out here. To calculate the partial pressure P of the component above the solution, only the knowledge of the pressure of the saturated vapor P° of a pure component is required at the given temperature and the amount of component in the liquid phase as a mole fraction x. Partial pressure of the component is then $P=xP°$.

Modification of the protective gas, i.e., its enrichment with vapors of volatile component, may also be carried out in other ways. The simplest, but a relatively costly method, consists in bubbling a finely dispersed gas through a large amount of the given monomer mixture which is stabilized against polymerization by addition of a nonvolatile inhibitor, e.g., copper (I) chloride, in one or more saturators. But the previously described method of this invention is much more advantageous and economical in operation.

The protective gas can be modified according to the invention by this especially advantageous method in two particular ways:

(1) Lowering the degree of saturation by decreasing the temperature of the saturator, i.e., the lowered temperature ($t_2$) of the saturator can be calculated from the temperature of the apparatus environment ($t_1$) if the temperature dependence of the pressure of saturated vapor is known, by means of the relationship $$p°(t_2)=xp°(t_1).$$

(2) Lowering of the degree of saturation by gas dilution. The protective gas is saturated in a saturator at a suitable constant temperature and the degree of saturation is lowered by dilution with the pure protective gas in the following ratio (of volumes, flow rates, and the like):

pure protective gas/saturated protective gas$=(1/x)-1$.

The protective gas may be saturated by the above described methods with a pure volatile component the concentration of which in the mixture is given as a mole fraction x. If the liquid contains more volatile components, the protective gas is formed by mixing the gas streams suitably saturated with individual components.

Thus, for example, 500 ml/min of a protective gas for the monomer mixture containing 2 mol-% acrylic acid as the volatile component can be prepared as follows: Rinsing of the apparatus and polymerization may be carried out at 35° C., when pure acrylic acid has the pressure of saturated vapor 1.036 kPa, i.e., its partial pressure above the given monomer mixture is (2/100).1.036−0.0207 kPa. If the saturator with acrylic acid has also the controlled temperature 35° C., then the flow rates of the pure protective gas and the protective gas saturated with acrylic acid have to be in the ratio (1/0.02)−1=49:1. This means that for the total flow rate 500 ml/min, the flow rates in individual branches must be: 490 ml/min pure protective gas (the main pipe branch) and 10 ml/min saturated protective gas (the auxiliary pipe branch).

The apparatus diagrammatically shown in the drawing consists of a main pipe branch leading the pure protective gas from a source thereof into polymerization apparatus 1 and of an auxiliary pipe branch for saturation of the protective gas with a volatile component.

The main pipe branch is formed by an inlet pipe 3 connected to a control valve 4 which serves for setting a constant volume flow rate of gas and further leading to a device 5 for measuring the flow rate of gas which is connected to an outlet pipe 6.

The auxiliary pipe branch is formed by an inlet pipe 7 connected to a control valve 8 which serves for setting a constant volume flow rate and leads into a device 9 for measuring the flow rate which is connected to a temperature-controlled saturator 10 for a pure volatile component of the monomer mixture. Saturator 10 is coupled to outlet pipe 6 of pure protective gas through an outlet pipe 11 so that a common inlet 12 to polymerization apparatus 2 results. Inlet pipe 7 of the auxiliary branch may be connected with inlet pipe 3 of the main branch, as is shown in the drawing, or it may be connected to an independent source of protective gas. The saturator can be connected to the auxiliary branch either before or behind device 9 for measurement of the flow rate. If the monomer mixture contains several volatile components, further auxiliary branches with control valves, devices for flow-rate measurement and saturators are connected in parallel between the source 1 of protective gas and the common inlet 12. In this case, as many saturators are inserted as there are volatile components in the monomer mixture. These auxiliary branches need not necessarily be connected to single common source 1 of protective gas but may have independent sources of protective gas.

In operation, the pure protective gas is led from source 1 thereof through inlet pipe 3 of the main branch and through inlet pipe 7 of the auxiliary branch via control valves 4 and 8 which are used for setting the required through-flow of protective gas (determined, e.g., by the above described calculation) checked with devices 5 and 9 for the measurement of through-flow of gas. The gas then passes in part directly into outlet pipe 6 of pure protective gas, partly through saturator 10, where it is saturated with the volatile component, into outlet pipe 11. The flows from the individual branches are combined and led through common inlet 12, where the pure protective gas and the gas saturated with the volatile component are mixed and homogenized, into polymerization apparatus 2.

We claim:

1. A method of casting a polymeric gel in an open mold from a liquid polymerization mixture containing at least one volatile monomer component dissolved therein which comprises providing a protective gas above the open surface of the polymerization mixture during polymerization, said protective gas prior to coming into contact with said open surface of the polymerization mixture being combined with an amount of said volatile monomer which wil be in equilibrium with the volatile monomer present within the polymerization mixture under polymerization conditions.

2. The method of claim 1 wherein polymerization is carried out in a rotating mold.

3. The method of claim 1 wherein the protective gas is at least one inert gas selected from the group consisting of nitrogen, argon and carbon dioxide.

4. The method of claim 1 wherein the polymerization mixture contains hydroxyethyl methacrylate, acrylic acid and a crosslinking agent, the volatile monomer being acrylic acid.

5. The method of claim 1 wherein the protective gas is at least one inert gas selected from the group consisting of nitrogen, argon and carbon dioxide.

6. The method of claim 3 wherein the polymerization mixture contains hydroxyethyl methacrylate, acrylic acid and a crosslinking agent, the volatile monomer being acrylic acid.

7. The method of claim 1 wherein polymerization is carried out in a rotating mold, the protective gas is selected from the group consisting of nitrogen, argon and carbon dioxide and the polymerization mixture contains hydroxyethyl methacrylate, acrylic acid and a crosslinking agent, the volatile monomer being acrylic acid.

8. The method of claim 1 wherein the polymerization mixture contains N-vinyl pyrrolidone and methyl methacrylate, the volatile monomer being methyl methacrylate.

9. The method of claim 2 wherein the polymerization mixture contains N-vinyl pyrrolidone and methyl methacrylate, the volatile monomer being methyl methacrylate.

10. The method of claim 3 wherein the polymerization mixture contains N-vinyl pyrrolidone and methyl methacrylate, the volatile monomer being methyl methacrylate.

11. The method of claim 1 wherein polymerization is carried out in a rotating mold, the protective gas is at least one gas selected from the group consisting of nitrogen, argon and carbon dioxide and the polymerization mixture contains N-vinyl pyrrolidone and methyl methacrylate, the volatile monomer being methyl methacrylate.

12. The method of claim 1 wherein the polymeric gel is cast in the form of a contact lens.

13. The method of claim 12 wherein polymerization is carried out in a rotating mold.

14. The method of claim 13 wherein the polymerization mixture contains hydroxyethyl methacrylate, acrylic acid and a crosslinking agent, the volatile monomer being acrylic acid.

15. The method of claim 13 wherein the polymerization mixture contains N-vinyl pyrrolidone and methyl methacrylate, the volatile monomer being methyl methacrylate.

* * * * *